United States Patent [19]
Kajitani et al.

[11] Patent Number: 6,154,129
[45] Date of Patent: Nov. 28, 2000

[54] OPERATION SYSTEM FOR TRANSMISSION DEVICES AND ALARM MONITORING METHOD

[75] Inventors: Hideki Kajitani; Shigeki Nakata, both of Kanazawa; Hideki Hagiwara, Kawasaki, all of Japan

[73] Assignee: Fujitsu Limited, Kawasaki, Japan

[21] Appl. No.: 09/167,261

[22] Filed: Oct. 7, 1998

[30] Foreign Application Priority Data

Oct. 16, 1997 [JP] Japan ..................................... 9-284140

[51] Int. Cl.[7] .................................................. G08B 29/00
[52] U.S. Cl. ......................... 340/506; 340/506; 340/511; 340/533; 340/825.06; 700/17
[58] Field of Search ..................................... 340/506, 511, 340/533, 825.06; 700/17; 708/139

[56] References Cited

U.S. PATENT DOCUMENTS 5,400,246  3/1995  Wilson et al. .................. 340/825.36 X

FOREIGN PATENT DOCUMENTS 58-151699  9/1983  Japan .
3-154463   7/1991  Japan .

*Primary Examiner*—Daryl Pope
*Attorney, Agent, or Firm*—Helfgott & Karas, PC.

[57] ABSTRACT

There is provided in accordance with the present invention an operation system for monitoring transmission devices, comprising: a memory storing an alarm monitoring program including, a manager process for receiving a first autonomous alarm notification transmitted from the transmission devices, a MIB management process for transmitting the first autonomous alarm notification transmitted from the manager process and storing the first autonomous alarm notification to a database, and a monitoring process for receiving the first autonomous alarm notification transmitted from the MIB management process and monitoring the first autonomous alarm notification, and the MIB management process further including, a re-transmission thread for storing the first autonomous alarm notification in the database; and a response reception thread for receiving the first autonomous alarm notification transmitted from the manager process and for transmitting the first autonomous alarm notification to the re-transmission thread and the monitoring process; and a processor for executing the alarm monitoring program.

20 Claims, 16 Drawing Sheets

OPERATION SYSTEM FOR TRANSMISSION DEVICES AND ALARM MONITORING METHOD

BACKGROUND OF THE INVENTION

1. Field of the Invention

The present invention relates to an operation system, for transmission devices on a network, which manages information inherent to the operation system, and control and monitoring information for the transmission devices, by using a database of MIB (Management Information Base) management process, and to an alarm monitoring method therefor. The MIB is a set of management objects which are units of management information for a network management function.

2. Related Arts

Recently, for the operation system, in addition to the implementation of control and monitoring for a plurality of transmission devices, a need has been noted for a real-time process and operational reliability for the control and monitoring of the transmission devices on the network.

FIG. 8 is a schematic diagram illustrating a network. In FIG. 8, a station terminal 200a for a subscriber A and a station terminal 200b for a subscriber B are connected together by a relay transmission path 300. A plurality of network centers 400, which serve as relay terminals, are provided along the relay transmission path 300.

Each of the station terminals 200a and 200b includes a switch 202; a terminal device 201, which serves as an interface between a subscriber line and the switch; a multiplexer 203 for multiplexing a plurality of lines; and a cross connector 204 for connecting and switching the transmission paths.

The network center 400 includes a multiplexer 401 and across connector 402. A transmission device according to the present invention comprises the above described mulitplexers 203 and 401 and the cross connectors 204 and 402.

FIG. 9 is a diagram illustrating the arrangement of a operation system for transmission device (OPS). In FIG. 9, a plurality of transmission devices 401, 402 ... and n located in the network 400, for example, are controlled by an operation system (OPS) 100. In the operation system 100, as will be described later, alarm notifications transmitted by the transmission devices are processed by a CPU 101, operation processing means, in accordance with an alarm monitoring program stored in a memory 102. The alarm notifications transmitted by the transmission devices are entered in a database 103. The processing results obtained by the CPU 101 are displayed on a display 104, and may be printed by a printer (not shown). The operation system 100 is provided for the station terminals 200 and network centers 400.

FIG. 10 is a diagram illustrating the configuration of the alarm monitoring program. As is shown in FIG. 10, the program is composed of four layers: a GUI (Graphical User Interface) process, a MIB management process, a manager process, and a communication control process.

The GUI process is a process for interfacing with a user, and includes a control process for controlling the transmission devices and a supervision process for supervising the transmission devices.

The MIB management process uses a database to manage a set of objects, which are information units to be managed in the GUI process.

The manager process serves as an interface between the MIB management process and the transmission devices. The communication control process is a process for controlling the physical communication functions of the transmission devices. These processes are managed by an operating system (OS).

FIG. 11 is a diagram for explaining an operational concept for a conventional operation system. In FIG. 11, a MIB management process 01 includes a control reception thread 02, control threads 03 and 04, a database (DB) 05, a response reception thread 06 and a notification thread 07. A thread is a processing unit in a process which is performed.

A notification thread queue 08 is provided in the memory 102 as an area where a notification message from the response reception thread 06 is enqueued when the notification thread 07 is in the operating state (BUSY). In this specification, term 'enqueue' means add an element (message) to a queue'.

Control processes 09 and 10 and a monitoring process 11 are GUI processes in FIG. 10, at a higher level than the MIB management process 01. The results obtained by the monitoring process 11 are displayed as a monitoring screen 16 on the display 104.

A manager process 12 serves as an interface for controlling and monitoring a plurality of transmission devices.

In FIGS. 12 through 16 are shown operation sequences of the conventional operation system. In FIG. 12 is represented an example where the transmission device detects a change in its state and transmits an autonomous alarm notification. In FIG. 12, the response reception thread 06 receives the autonomous alarm notification (1) from the manager process 12 and transmits it to the notification thread 07, which is in a standby state (IDLE). Upon the receipt of the autonomous alarm notification (1), the notification thread 07 is set to the operating state (BUSY) and enters the autonomous alarm notification (1) in the database DB 05. When the notification thread 07 receives a setup response (1), it transmits the autonomous alarm notification (1) to the monitoring process 11, and returns to the standby state (IDLE).

FIG. 13 represents an example where an autonomous alarm notification is transmitted by a plurality of transmission devices. The response reception thread 06 receives an autonomous alarm notification (2) from the manager process 12, and transmits it to the notification thread 07 in the standby state. Upon the receipt of the autonomous alarm notification (2), the notification thread 07 is set to the operating state (BUSY), and enters the autonomous alarm notification (2) in the database DB 05. When the notification thread 07 receives a setup response (2), it transmits the autonomous alarm notification (2) to the monitoring process 11.

At this time, the response reception thread 06 may receive the autonomous alarm notifications (3) and (4) from the manager process 12 before it transmits the autonomous alarm notification (2) to the monitoring process 11. In this case, since the notification thread 07 is in the operating state (BUSY), the autonomous alarm notifications (3) and (4) are sequentially enqueued in the notification thread queue 08.

When the notification thread 07 has transmitted the autonomous alarm notification (2), it dequeues an autonomous alarm notification (3) from the notification thread queue 08. In this specification, term 'dequeue' means 'take out an element (message) from a queue'. As well as for the autonomous alarm notification (2), the notification thread 07 enters the autonomous alarm notification (3) in the database DB 05, and transmits it to the monitoring process 11. The notification thread 07 performs the same process for the autonomous alarm notification (4), and returns to the standby state (IDLE).

FIG. 14 represents an example where the alarm state of the transmission device is acquired by the performance of the monitoring process 11. In this case, much time and many procedures are required to directly access the transmission device (i.e., to shift down to the communication control process in FIG. 10) in order to obtain its alarm state. Therefore, for simplification, the autonomous alarm notification is read which has been entered in the database DB 05 during the MIB management process, explained while referring to FIGS. 12 and 13.

Specifically, when the control reception thread 02 receives an alarm re-transmission request from the monitoring process 11, it transmits it to the control thread 03, which is in the standby state (IDLE). Upon the receipt of the alarm re-transmission request, the control thread 03 is set to the operating state (BUSY), reads all the autonomous alarm notifications from the database DB 05, and transmits them as alarm re-notifications to the monitoring process 11. In FIG. 14, the alarm re-notifications (1), (2), . . . and (5) correspond to the autonomous alarm notifications (1), (2), . . . and (5). Finally, the control thread 03 transmits an alarm re-transmission response to the monitor process 11, and returns to the standby state (IDLE).

FIG. 15 represents an example where an autonomous alarm notification is output during the transmission of the alarm re-notification. The control reception process 02 receives an alarm re-notification request from the monitoring process 11 and transmits it to the control thread 03, which is in the standby state (IDLE). Upon the receipt of the alarm re-notification request, the control thread 03 is set to the operating state (BUSY), reads all the autonomous notifications from the database DB 05, and transmits them as alarm re-notifications to the monitoring process 11 in the same manner as in FIG. 14. Finally, the control thread 03 transmits an alarm re-transmission response to the monitoring process 11.

As is shown in FIG. 15, before the control thread 03 transmits the alarm re-notification (5) to the monitoring process 11, the response reception thread 06 receives the autonomous alarm notification (5) from the manager process 12 and transmits it to the notification thread 07. Then, the notification thread 07 enters the autonomous alarm notification (5) in the database DB 05, and transmits it to the monitoring process 11. Following this, the alarm re-notification (5) is transmitted to the monitoring process 11. Therefore, as will be described later, the processing order for a new autonomous alarm notification and for an alarm re-notification corresponding to the preceding autonomous alarm notification is inverted.

In FIG. 16, the control reception thread 02 receives an alarm re-transmission request from the monitoring process 11, and returns a control thread BUSY error to the monitoring process 11.

Such a conventional operation system, however, has the following problems. First, in FIG. 13, when an autonomous alarm notification is frequently transmitted by the manager process 12, the process performed by the notification thread 07 can not catch up with it because of the time required to access the database DB 05, so that the autonomous alarm notification can not be transmitted to the monitoring process 11 in real time.

In addition, in FIG. 15, if, during the alarm re-transmission, the monitoring process 11 receives the autonomous alarm notification from the notification thread 07 before the process 11 receives all the alarm re-notifications from the control thread 03, the processing order for the alarm re-notification and for the autonomous alarm notification is inverted.

Specifically, the autonomous alarm notification output during the transmission of the alarm re-notification, is an alarm to provide notification of the occurrence of a new obstacle in the transmission device. When the alarm re-notification is information for providing notification of the recovery from an obstacle previously, these two notifications may be inverted and transmitted to the monitoring process 11, so that the monitoring process 11 will be notified that the new obstacle has been removed.

SUMMARY OF THE INVENTION

To resolve the above problems, it is one object of the present invention to provide operation system for monitoring transmission devices and a method for monitoring the transmission devices in the operation system, wherein during the normal operation of a monitoring process, an autonomous alarm notification can be received in real time, and during an alarm re-transmission an alarm re-notification and an autonomous alarm notification can also be processed as a time series, and an alarm monitoring method therefor.

To achieve the above object, according to one aspect of the present invention, the operation system comprises:

a memory storing an alarm monitoring program including, a manager process for receiving a first autonomous alarm notification transmitted from the transmission devices, a MIB management process for transmitting the first autonomous alarm notification transmitted from the manager process and storing the first autonomous alarm notification to a database, and a monitoring process for receiving the first autonomous alarm notification transmitted from the MIB management process and monitoring the first autonomous alarm notification, and the MIB management process further including, a re-transmission thread for storing the first autonomous alarm notification in the database; and a response reception thread for receiving the first autonomous alarm notification transmitted from the manager process and for transmitting the first autonomous alarm notification to the re-transmission thread and the monitoring process; and a processor for executing the alarm monitoring program.

With this arrangement, the autonomous alarm notification received from the response reception thread can be processed in real time.

The operation system of the present invention further includes a re-transmission thread queue in the MIB management process for queuing the autonomous alarm notifications transmitted from the response reception thread.

When the response reception thread receives a second autonomous alarm notification before the first autonomous alarm notification is stored in the database, the response reception thread transmits the second autonomous alarm notification to the monitoring process and enqueues the second autonomous alarm notification to the re-transmission thread queue.

After the first autonomous alarm notification is stored in the database, the re-transmission thread dequeues the second autonomous alarm notification from the re-transmission thread queue, and stores the second autonomous alarm notification in the database.

As a result, a plurality of autonomous alarm notifications received from the response reception thread can be processed in real time, and separately from the autonomous alarm notification processing in the monitoring process, the autonomous alarm notifications can be sequentially entered in the database.

According to the operation system of the present invention, when the monitoring process transmits an alarm re-transmission request notification to the response reception thread to read out the autonomous alarm notification stored in the database, the response reception thread transmits an alarm re-transmission start notification to the monitoring process and the re-transmission thread, the re-transmission thread reads out the autonomous alarm notification stored in the database and transmits the autonomous alarm notification as an alarm re-notification to the monitoring process.

The memory of the operation system of the present invention further includes a re-transmission buffer storing the autonomous alarm notification, when the monitoring process receives the autonomous alarm notification transmitted from the response reception thread before receiving the alarm re-notification corresponding the autonomous alarm notification; and after receiving the alarm re-notification, the monitoring process reads out the third autonomous alarm notification from the re-transmission buffer.

As is described above, since the autonomous alarm notification received during the alarm re-transmission is processed after the alarm re-notification has been processed, the alarm re-notification and the autonomous alarm notification can be processed as a time series.

The memory of the operation system of the present invention further includes a re-transmission flag which is set when the monitoring process receives the alarm re-transmission start notification; and the autonomous alarm notification received by the monitoring process is stored in the re-transmission buffer while the re-transmission flag is set, and after reading out the autonomous alarm notification from the re-transmission buffer by the monitoring process, the re-transmission flag is reset.

Since in this operation system the autonomous alarm notification received during the alarm re-notification is processed after the alarm re-notification has been processed, the alarm re-notification and the autonomous alarm notification can be processed as a time series.

In addition, the memory of the operation system of the present invention further includes an alarm notification synchronous flag corresponding to each the alarm re-notification, which is set when the monitoring process receives the alarm re-notification or the autonomous alarm notification corresponding to the alarm re-notification, and when the monitoring process receives the alarm re-notification after the corresponding alarm notification synchronous flag is set by receiving the autonomous alarm notification, the monitoring process abandons the alarm re-notification.

When the autonomous alarm notification is received from the response reception thread by the monitoring process, the autonomous alarm notification is processed, regardless of whether the corresponding alarm notification synchronous flag has been set or reset. When the corresponding flag has been reset, it is set.

In the operation system of the present invention, the autonomous alarm notification received during the alarm re-transmission is processed in real time. The flag corresponding to the autonomous alarm notification is set and the alarm re-notification corresponding to that flag is abandoned. Therefore, since an alarm re-notification which corresponds to the autonomous alarm notification received during the alarm re-transmission is not processed after the autonomous alarm notification has been processed, the autonomous alarm notification and the alarm re-notification will not be invertedly processed as a time series.

In the operation system of the present invention, all alarm re-notifications are transmitted from the re-transmission thread to the monitoring process, and an autonomous alarm notification from the response reception thread is stored in the database by the re-transmission thread.

The alarm re-transmission start notification may have a predetermined condition concerning the autonomous alarm notification stored in the database. In this case, the autonomous alarm notification corresponding to the predetermined condition is read out by the re-transmission thread.

The above condition is, for example, a range condition for designating a range for an autonomous alarm notification, or an alarm condition for designating a type of autonomous alarm notification.

Other features and advantages of the present invention will become readily apparent from the following description when taken in conjunction with the accompanying drawings.

DETAILED DESCRIPTION OF THE PREFERRED EMBODIMENTS

Figure 1:
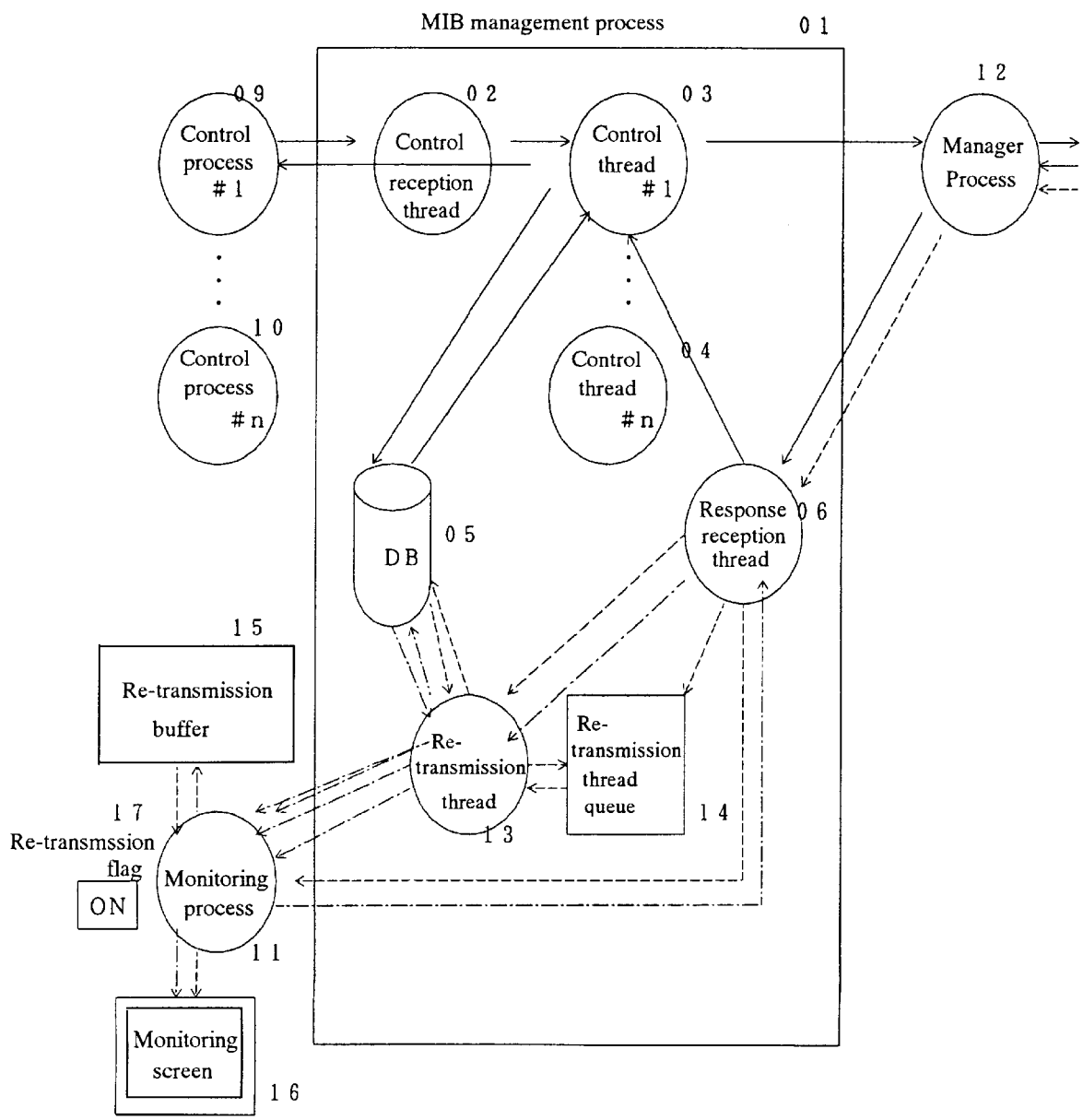
FIG. 1 is a diagram for explaining the operational concept of a operation system for transmission device according to a first embodiment of the present invention.

The preferred embodiments of the present invention will now be described. The technical scope of this invention, however, is not limited to these embodiments. The same reference numerals are used throughout to denote corresponding or identical components in the drawings.

FIG. 1 is a diagram for explaining the operational concept of an operation system according to a first embodiment of the present invention. The arrangement of the operation system according to the embodiment is the same as that in FIG. 9. A CPU 101, which is the processing means, handles an alarm notification from a transmission device in accordance with an alarm monitoring program stored in a memory 102 in an operation system 100 in FIG. 9. The results obtained are presented on a display 104. The alarm notification is entered in a database 103.

Figure 9:
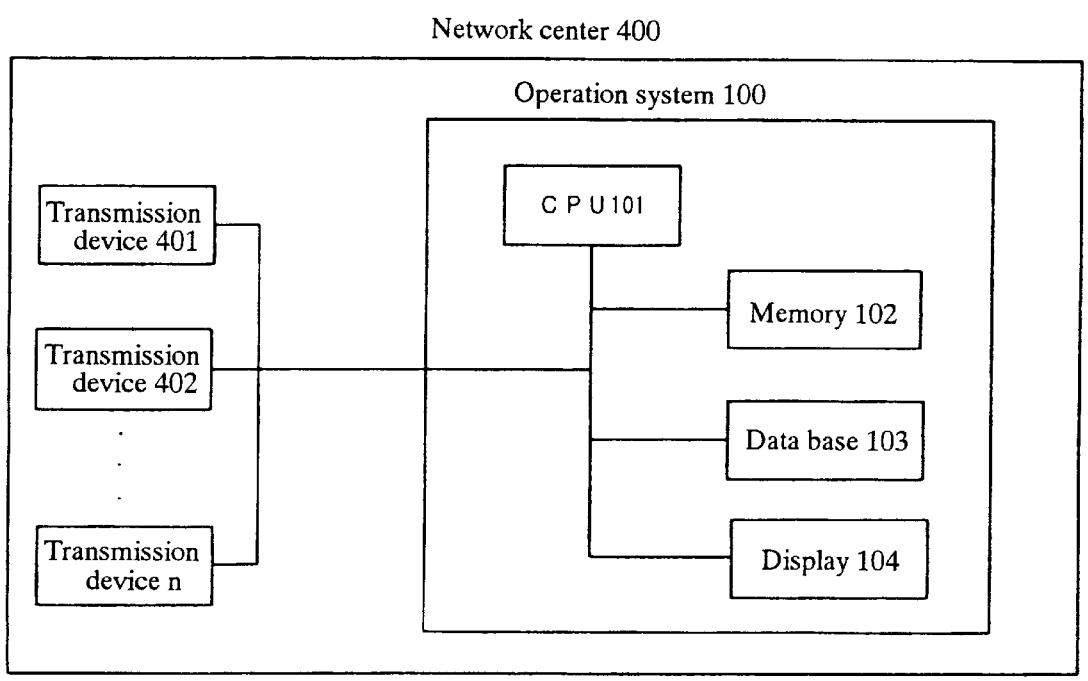
FIG. 9 is a diagram illustrating the arrangement of the operation system.
Figure 10:
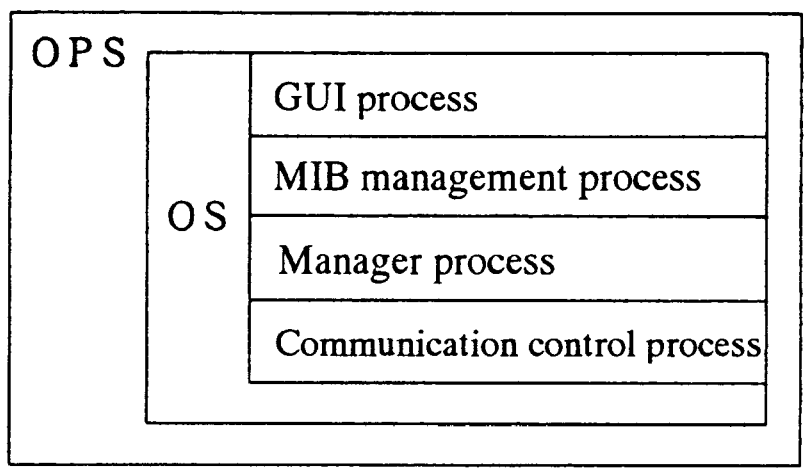
FIG. 10 is a diagram illustrating the configuration of an alarm monitoring program (OPS) in the operation system.

In FIG. 1, a MIB management process 01 in the alarm monitoring program of the operation system comprises a control reception thread 02, control threads 03 and 04, a database DB 05, a response reception thread 06 and a re-transmission thread 13. A re-transmission thread queue 14, provided in the memory 102 in FIG. 9, is an area in which messages from the response reception thread 06 are enqueued when a re-transmission thread 13 is in an operating state (BUSY).

Control processes 09 and 10 and a monitoring process 11 are processes at higher levels than the MIB management process 01, as previously described. A re-transmission buffer 15 is provided in the memory 102 in FIG. 9 to hold the autonomous alarm notifications received from the response reception thread 06 while the monitoring process 11 is issuing an alarm re-transmission request. The results obtained by the monitoring process 11 are displayed as a monitoring screen 16 on the display 104.

The monitoring process 11 further includes a re-transmission flag 17 to indicate whether an alarm is being re-transmitted. The re-transmission flag 17 is provided in the memory 102 in FIG. 9.

The features of the arrangement in FIG. 1 are that the re-transmission thread 13 and the re-transmission thread queue 14 are provided in the MIB management process 01 of the operation system, and that the retransmission buffer 15 and the re-transmission flag 17 are provided for the monitoring process 11.

In FIGS. 2 through 5 are shown operational sequences for the operation system according to the first embodiment of the present invention.

Figure 2:
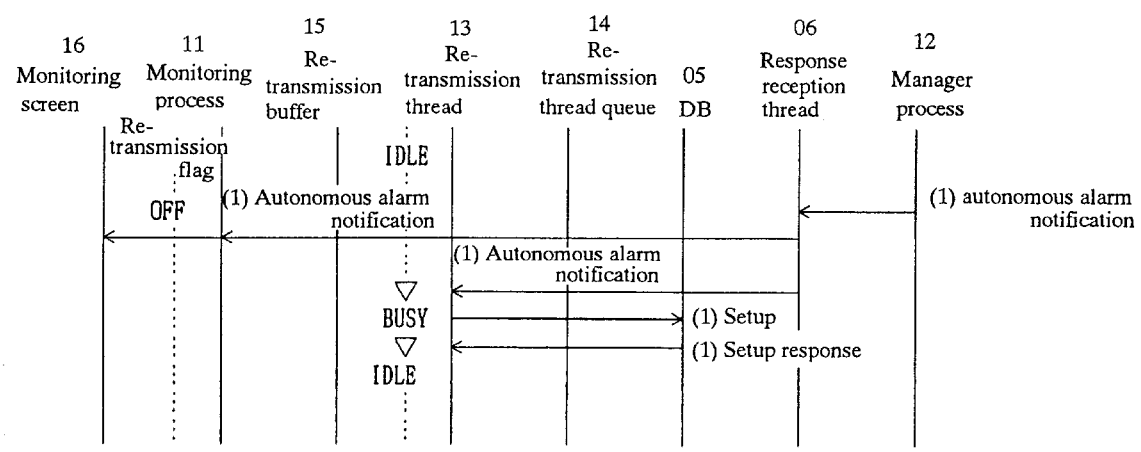
FIG. 2 is a diagram showing operational sequence (1) of the operation system according to the first embodiment of the present invention.

FIG. 2 represents an example where a single autonomous alarm notification is transmitted. The response reception thread 06 receives an autonomous alarm notification (1) from a manager process 12, and broadcasts (simultaneous transmission of data to more than one destination) it to the monitoring process 11 and the re-transmission thread 13, which is in the standby state (IDLE). Therefore, the monitoring process 11 can receive the autonomous alarm notification (1) in real time without waiting until the autonomous alarm notification (1) is entered in the database DB 05. The re-transmission thread 13, which has received the autonomous alarm notification (1), is set to the operating state (BUSY) and enters the autonomous alarm notification (1) in the database DB 05, receives a setup response (1), and returns to the standby state (IDLE).

Figure 3:
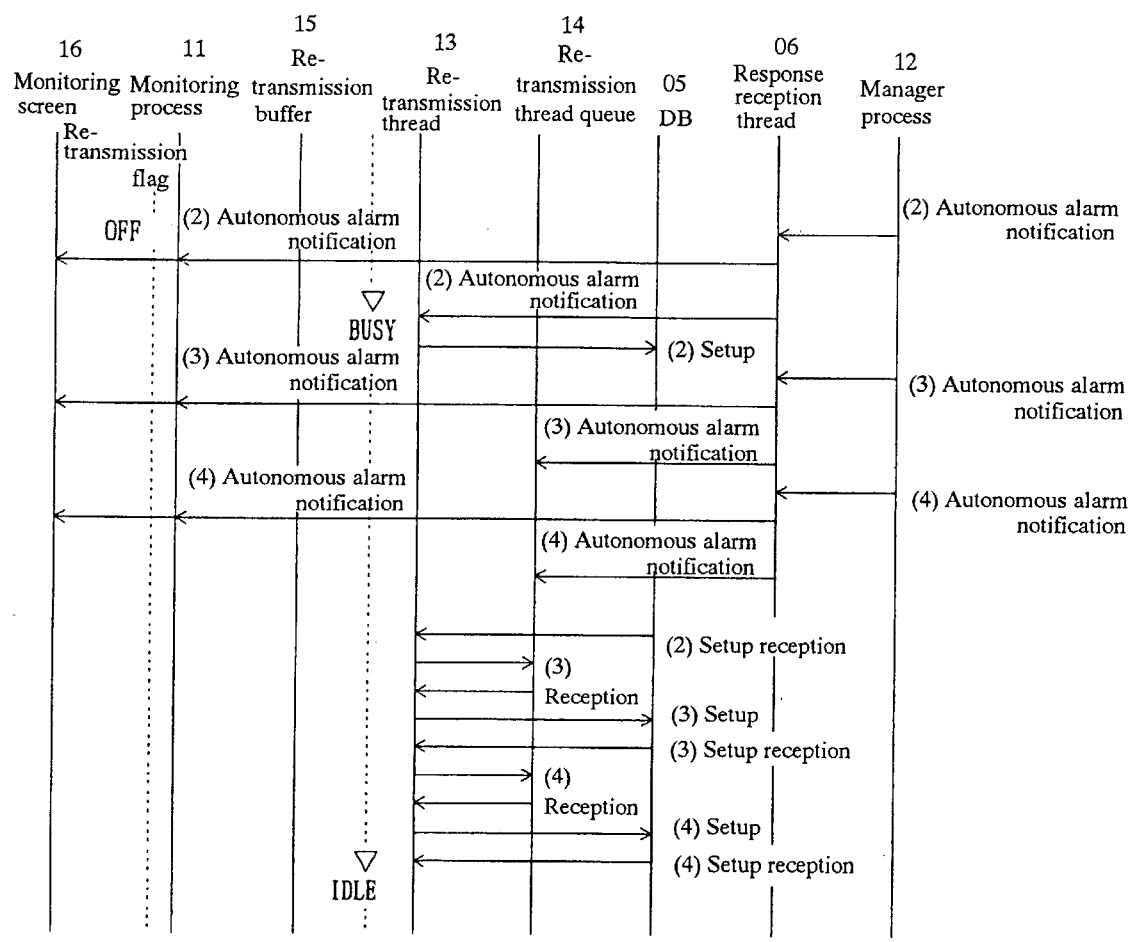
FIG. 3 is a diagram showing operational sequence (2) of the operation system according to the first embodiment of the present invention.

FIG. 3 represents an example where a plurality of autonomous alarm notifications are transmitted. The response reception thread 06 receives an autonomous alarm notification (2) from the manager process 12, and broadcasts it to the monitoring process 11 and the re-transmission thread 13, which is in the standby state (IDLE). Upon the receipt of the autonomous alarm notification (2), the re-transmission thread 13 is set to the operating state (BUSY), and enters the autonomous alarm notification (2) in the database DB 05 and receives a setup response (2).

At this time, before the autonomous alarm notification (2) is entered in the database DB 05, i.e., when the re-transmission thread 13 is in the operating state (BUSY), the response reception thread 06 receives autonomous alarm notifications (3) and (4) from the manager process 12, and then sequentially transmits them to the monitoring process 11 in real time and sequentially adds them to the re-transmission thread queue 14.

As a result, even when autonomous alarm notifications are frequently transmitted by the manager process 12, they can always be transmitted to the monitoring process 11 in real time and in parallel to the entry of these notifications in the database DB 05, so that the processing speed can be improved.

After the re-transmission thread 13 has set the autonomous alarm notification (2), it dequeues the autonomous alarm notification (3) from the re-transmission thread queue 14 and enters it in the database DB 05. The autonomous alarm notification (4) is dequeued and set in the same manner, and the re-transmission thread 13 thereafter returns to the standby state (IDLE).

Figure 4:
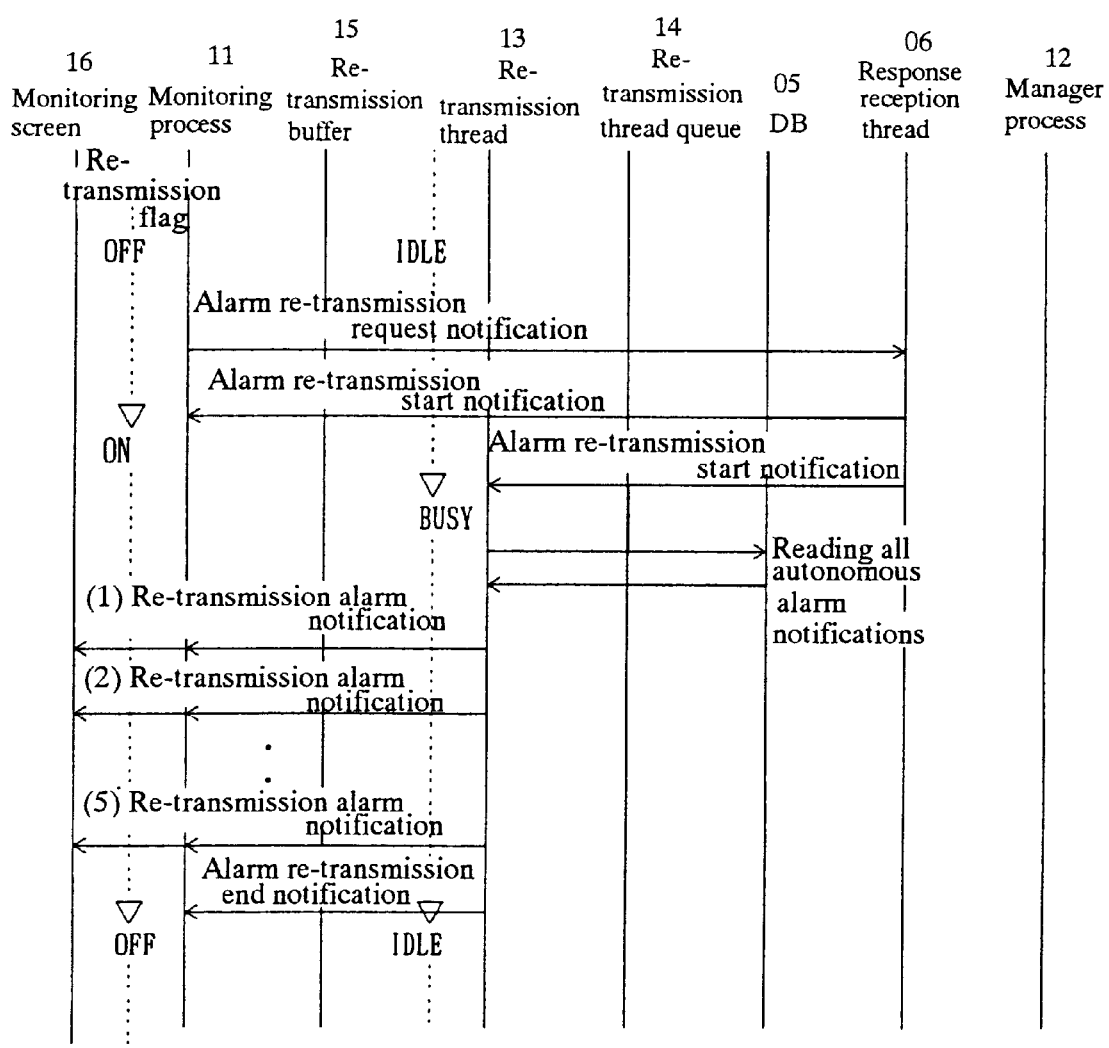
FIG. 4 is a diagram showing operational sequence (3) of the operation system according to the first embodiment of the present invention.

FIG. 4 represents an example where the alarm state of a transmission device is acquired from the monitoring process 11. In this embodiment, an alarm re-transmission request notification (corresponding to an alarm re-transmission request in the prior art) is transmitted from the monitoring process to the response reception thread 06. Upon the receipt of the alarm re-transmission request notification from the monitoring process 11, the response reception thread 06 broadcasts (simultaneous transmission of data to more than one destination) an alarm re-transmission start notification to the monitoring process 11 and the re-transmission thread 13, which is in the standby state (IDLE). Upon the receipt of the alarm re-transmission start notification, the re-transmission thread 13 is set to the operating state (BUSY), reads all the autonomous alarm notifications from the database DB 05 and sequentially transmits them to the monitoring process 11, and finally transmits an alarm re-transmission end notification and returns to the standby state (IDLE).

Figure 11:
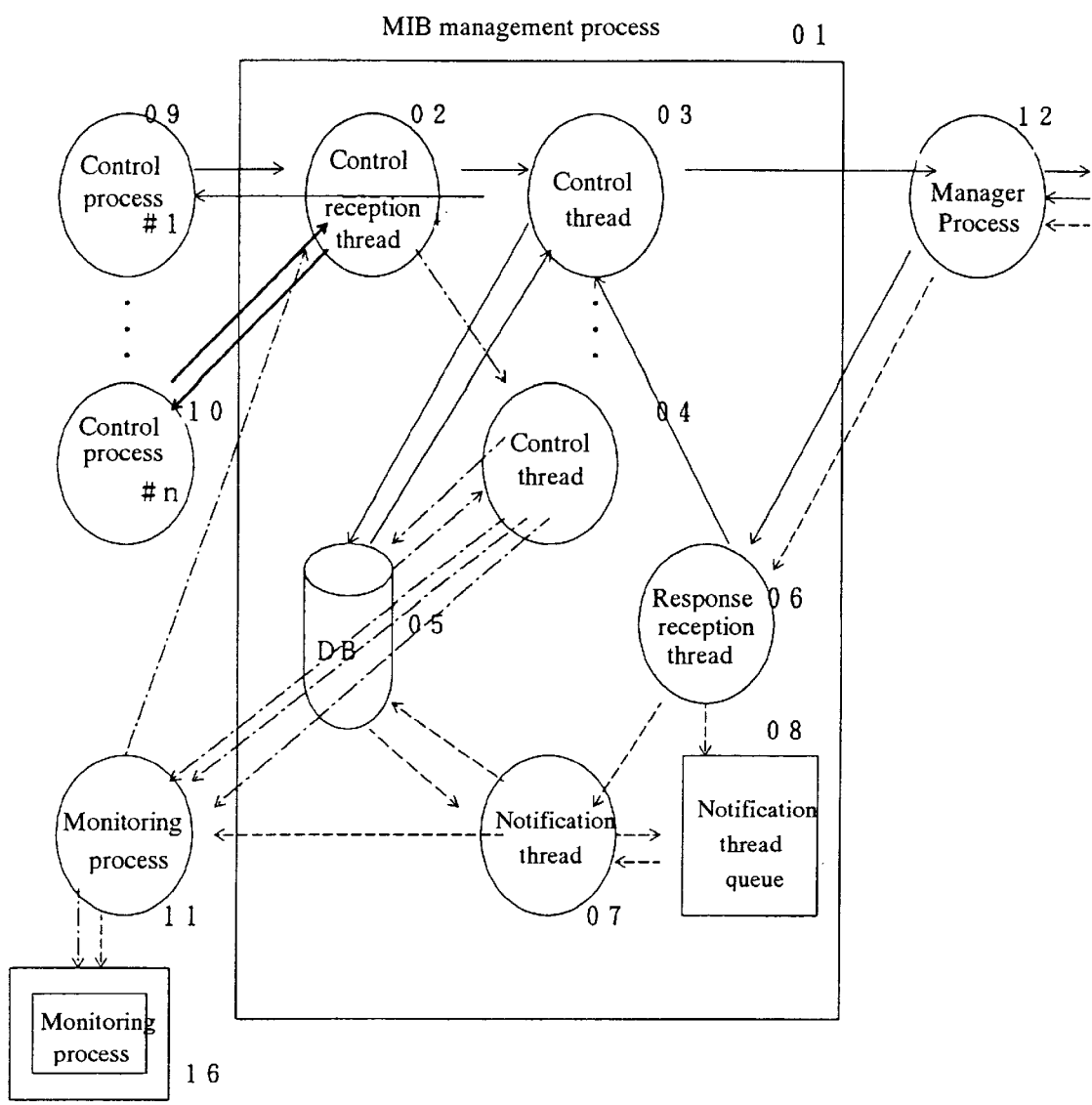
FIG. 11 is a diagram for explaining the operation concept of a conventional operation system for transmission devices.
Figure 12:
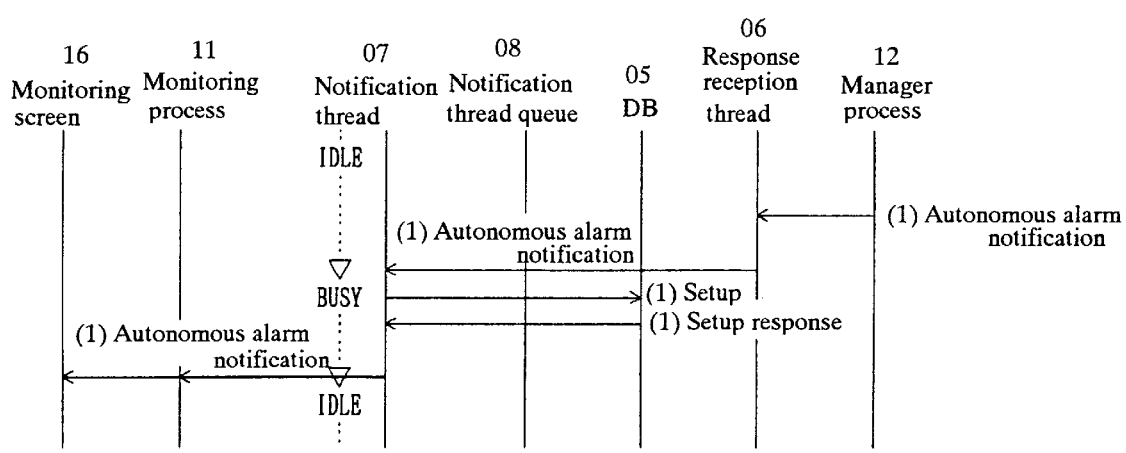
FIG. 12 is a diagram showing operational sequence (1) of the conventional operation system.
Figure 13:
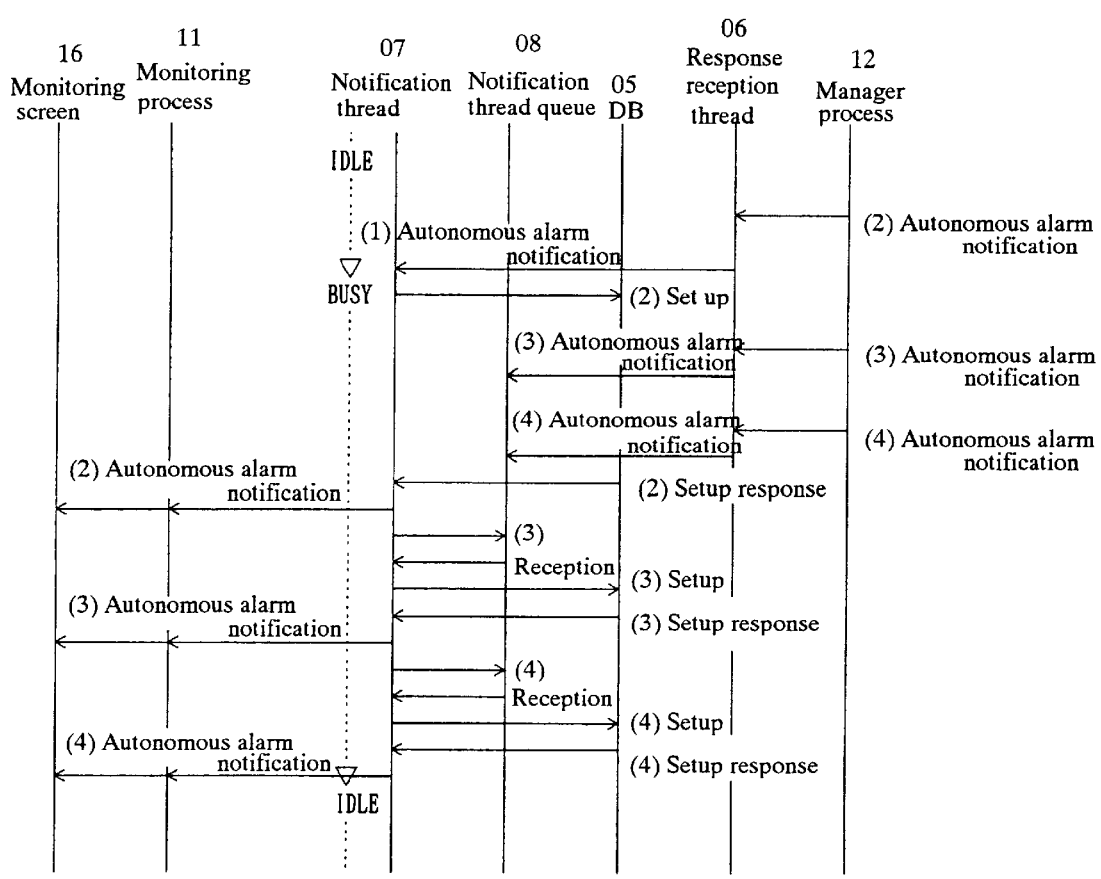
FIG. 13 is a diagram showing operational sequence (2) of the conventional operation system.
Figure 14:
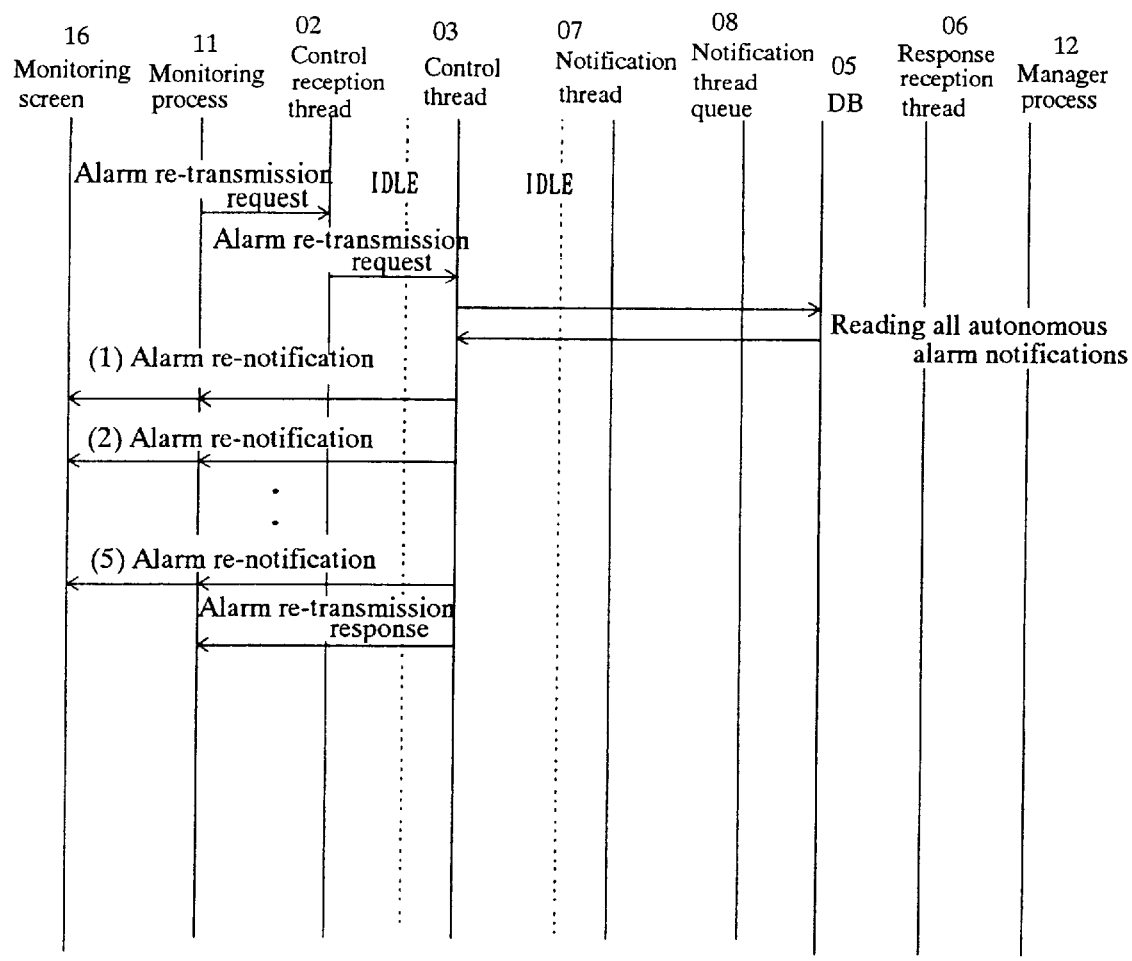
FIG. 14 is a diagram showing operational sequence (3) of the conventional operation system.
Figure 15:
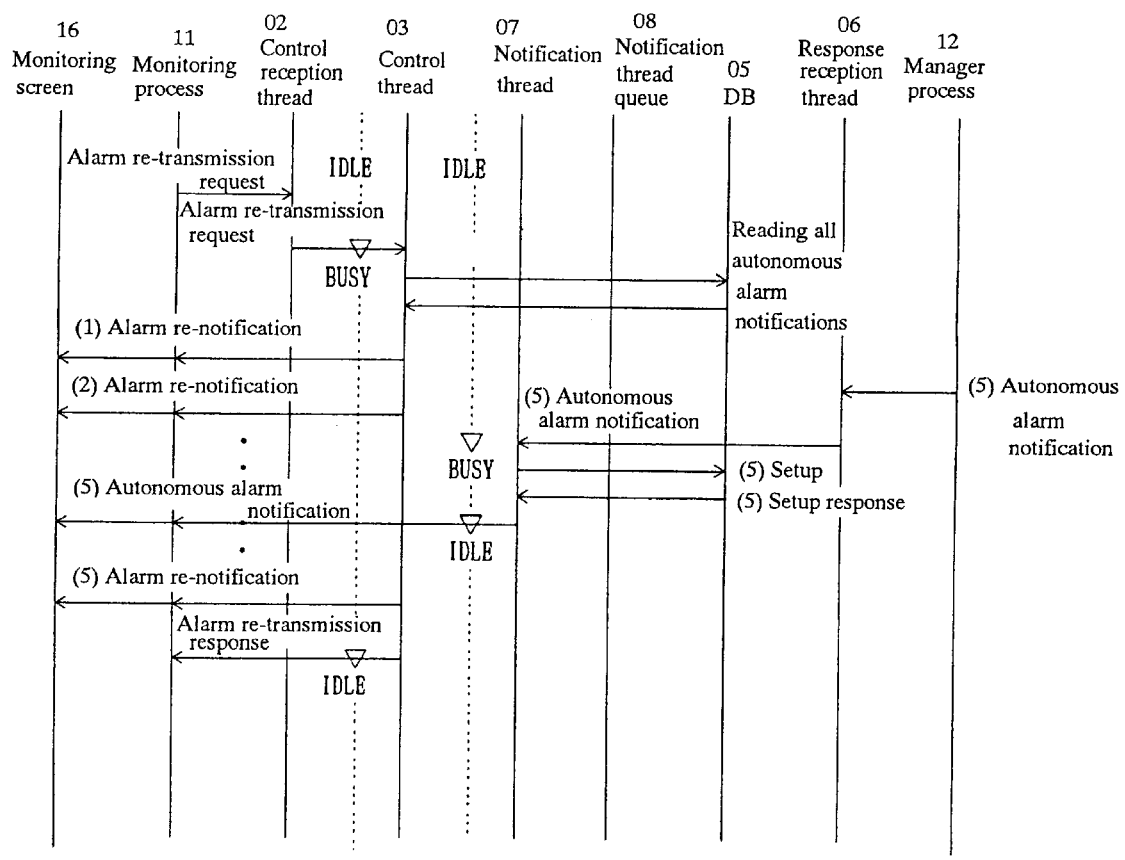
FIG. 15 is a diagram showing operational sequence (4) of the conventional operation system.
Figure 16:
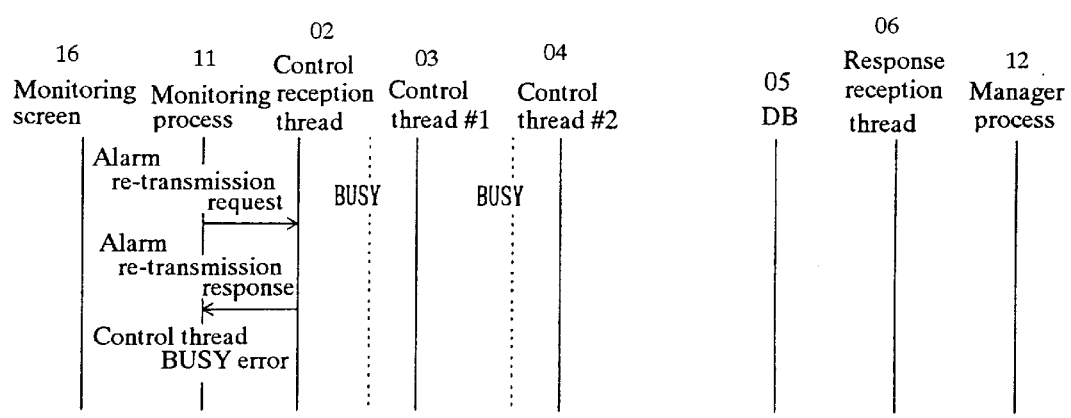
FIG. 16 is a diagram showing operational sequence (5) of the conventional operation system.

In this embodiment, since the alarm re-transmission request notification is not transmitted to the control threads 03 and 04 in FIG. 11 or 16, even though they are in the operating state (BUSY) the re-transmission thread 13 initiates the processing in the same manner as for the autonomous alarm notification, so that an error response does not occur.

Figure 5:
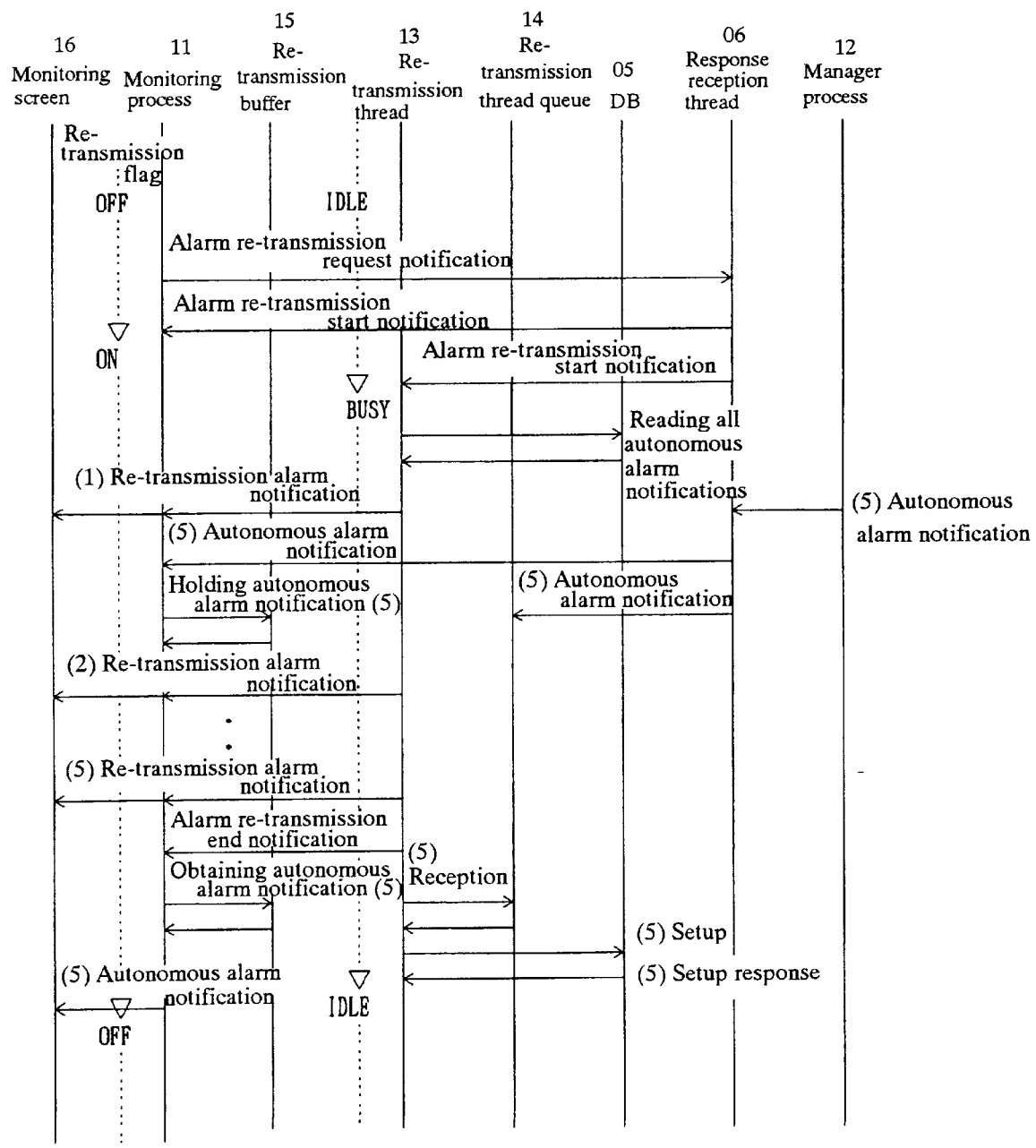
FIG. 5 is a diagram showing operational sequence (4) of the operation system according to the first embodiment of the present invention.

FIG. 5 represents an example where an autonomous alarm notification is transmitted during the transmission of an alarm re-notification. In FIG. 5, as well as in FIG. 4, first, the response reception thread 06 receives the alarm re-transmission request notification from the monitoring process 11, and broadcasts the alarm re-transmission start notification to the monitoring process 11 and the re-transmission thread 13, which is in the standby state (IDLE). Upon the receipt of the alarm re-transmission start notification, the re-transmission thread 13 is set to the operating state (BUSY), reads all the autonomous alarm notifications from the database DB 05 and sequentially transmits them to the monitoring process 11, and finally transmits an alarm re-transmission end notification.

At this time, before the alarm re-notification (5) is transmitted to the monitoring process 11, the response reception thread 06 receives the autonomous alarm notification (5)

from the manager process 12. In this embodiment, then, the monitoring process 11 receives the alarm re-transmission start notification (1) and sets the re-transmission flag 17, as is shown in FIG. 5.

When the autonomous alarm notification (5) is transmitted from the response reception thread 06 to the monitoring process 11 while the re-transmission flag 17 is set, the autonomous alarm notification (5) is temporarily held in the re-transmission buffer 15. After the transmission thread 13 has transmitted all the alarm re-notifications, and the monitoring process 11 has received an alarm re-transmission end notification, the monitoring process 11 reads out the autonomous alarm notification (5) from the re-transmission buffer 15 for monitoring it. The re-transmission flag 17 is thereafter reset.

Therefore, even when the autonomous alarm notification is received while the alarm re-transmission is in progress, the reception order for the alarm re-notification (5) and the autonomous alarm notification (5) is not inverted, and the conventional problem can be resolved.

In FIG. 5, the autonomous alarm notification (5) is enqueued to the re-transmission thread queue 14 in addition to the monitoring process 11 as described in FIG. 3. The re-transmission thread 13 dequeues the autonomous alarm notification (5) from the re-transmission thread queue 14 and enters it to the database 05, after the re-transmission thread transmits the alarm re-transmission end notification to the monitoring process 11.

Figure 6:
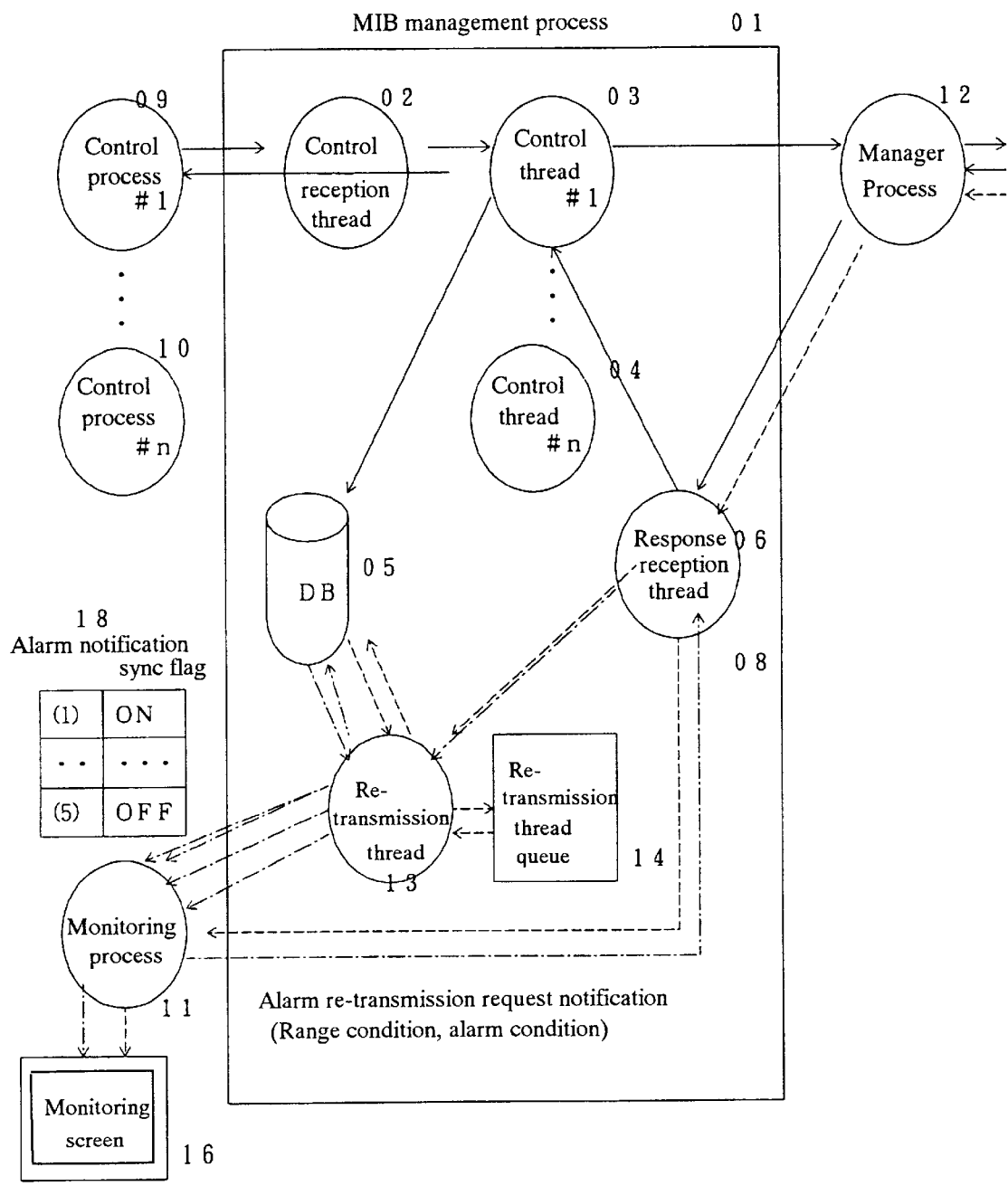
FIG. 6 is a diagram for explaining the operational concept of a operation system according to a second embodiment of the present invention.

FIG. 6 is a diagram for explaining the operational concept of an operation system according to a second embodiment of the present invention. In the second embodiment, the re-transmission buffer 15 and the re-transmission flag 17 in the first embodiment are replaced by an alarm notification synchronous flag 18. Specifically, a monitoring process 11 includes the alarm notification synchronous flag 18 for device IDs, class IDs and instance IDs of individual transmission devices, and adds, to an alarm re-transmission start notification, a range condition (e.g., a device ID, a class ID, an instance ID) and an alarm condition (e.g., the occurrence of or the recovery from an obstacle) so that the conditions can be arbitrarily set as needed. An arbitrary ID or a global ID, with which all the IDs can be designated, can be assigned for the device ID, the class ID and the instance ID. The alarm notification synchronous flag 18 is provided in the memory 102 in FIG. 9.

The features of the arrangement in FIG. 6 are that the re-transmission buffer 15 and the re-transmission flag 17 in the monitoring process 11 in FIG. 1 are replaced, for each autonomous alarm notification, by the alarm notification synchronous flag 18 in order to process an autonomous alarm notification in real time, and that the range condition and the alarm condition are added to the alarm re-transmission request notification so that these conditions can be arbitrarily set to re-transmit only a required notification.

Figure 7:
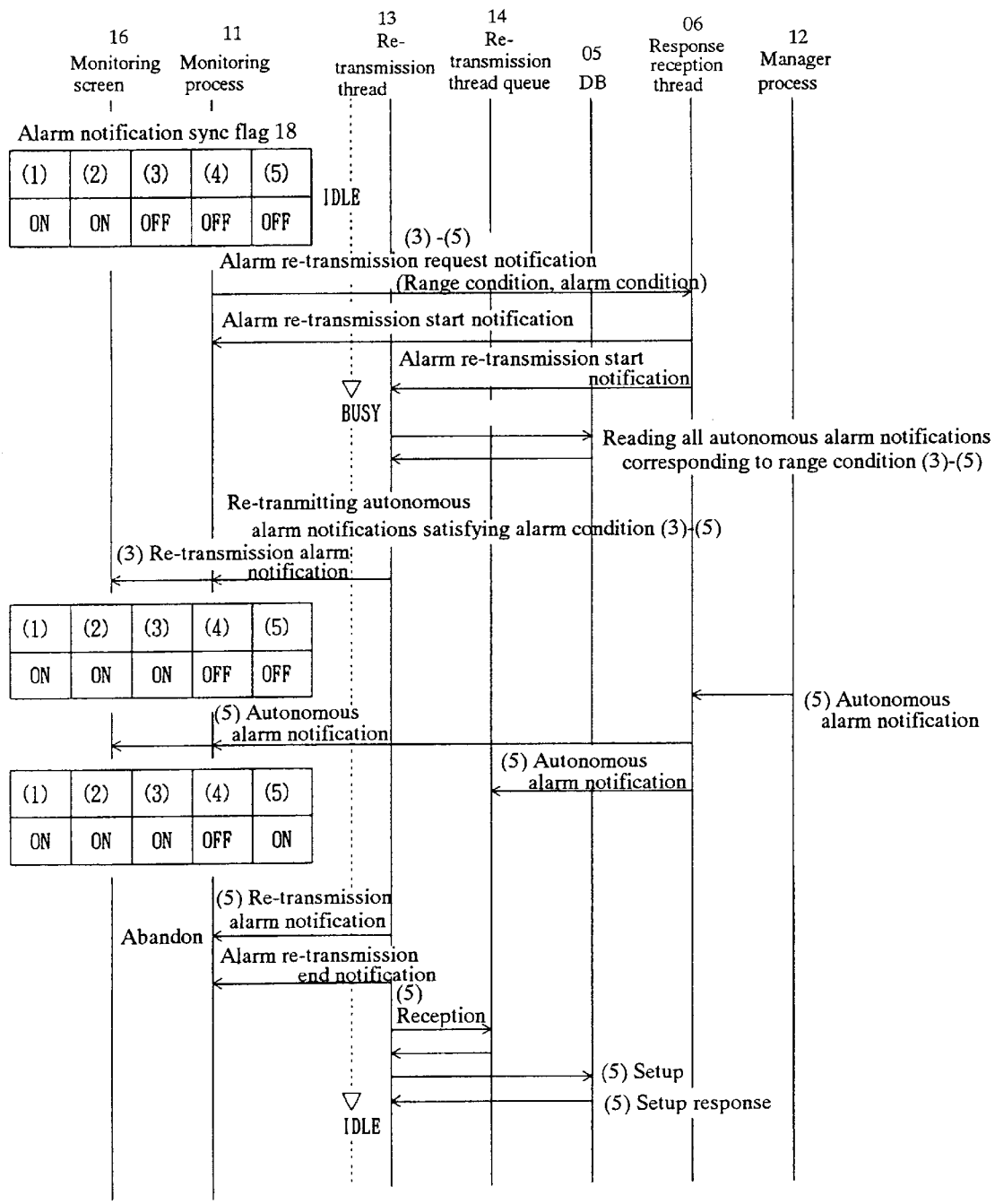
FIG. 7 is a diagram showing the operational sequence of the operation system according to the second embodiment of the present invention.
Figure 8:
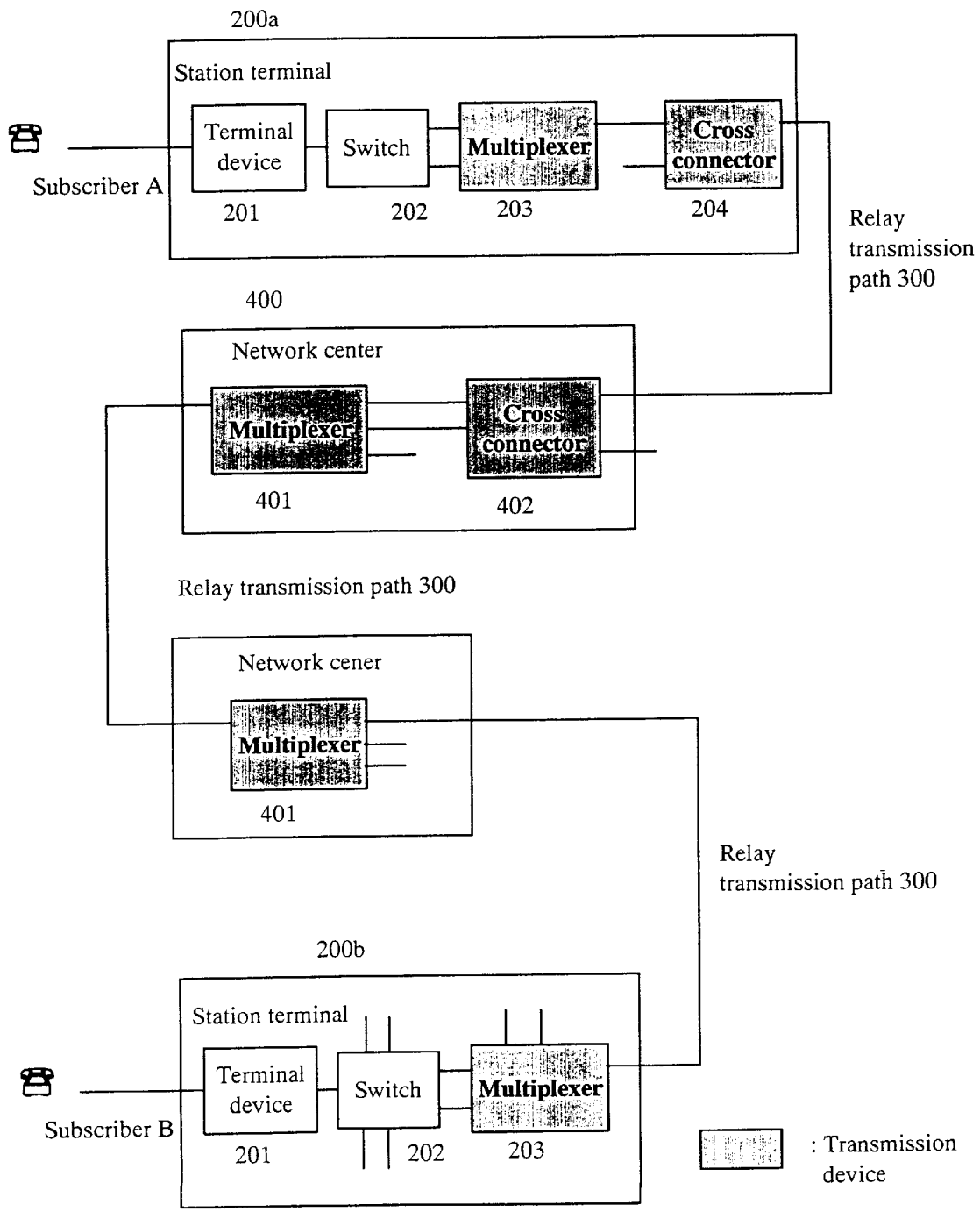
FIG. 8 is a diagram illustrating the outline of a network.

FIG. 7 represents an operational sequence according to the second embodiment of the present invention. In FIG. 7, the monitoring process 11 sets an arbitrary range condition and an alarm condition for the alarm re-transmission request notification, and the alarm notification synchronous flags 18 corresponding to the range condition are reset. Assume that autonomous alarm notifications (3), (4) and (5) are set as the range condition in FIG. 7, and an alarm for giving notification of the recovery of the transmission device from the obstacle is set as the alarm condition, and that the autonomous alarm notifications which satisfy the alarm condition are alarm re-notifications (3) and (5), of the autonomous alarm notifications (3), (4) and (5).

The response reception thread 06 receives, from the monitoring process 11, the alarm re-transmission request notification that includes the above described range and alarm conditions, and broadcasts the alarm re-transmission start notification to the monitoring process 11 and the re-transmission thread 13, which is in the standby state (IDLE). Upon the receipt of the alarm re-transmission start notification, the re-transmission thread 13 reads from the database DB 05 the autonomous alarm notifications corresponding to the range condition, i.e., the autonomous alarm notifications (3), (4) and (5). The re-transmission thread 13 sequentially re-transmits to the monitoring process 11 those autonomous alarm notifications which satisfy the alarm condition, i.e., the autonomous alarm notifications (3) and (5) in this embodiment, and finally transmits an alarm re-transmission end notification.

When a corresponding alarm notification synchronous flag 18 is reset, upon the receipt of the alarm re-notification from the re-transmission thread 13, the monitoring process 11 displays it on the monitoring screen 16 and sets the corresponding flag 18. In FIG. 7, for example, the monitoring process 11 receives the alarm re-notification (3) and sets the corresponding alarm notification synchronous flag 18 (3).

In addition, in FIG. 7, as well as in FIG. 5, the response reception thread 06 receives the autonomous alarm notification (5) from the manager process 12 before the alarm re-notification (5) is transmitted by the re-transmission thread 13. In the second embodiment, the autonomous alarm notification (5) is transmitted to the monitoring process 11 in real time and is displayed on the monitoring screen 16. At the same time, the monitoring process 11 sets a corresponding alarm notification synchronous flag 18 (5), as is shown in FIG. 7.

Following this, the monitoring process 11 receives the alarm re-notification (5) from the re-transmission thread 13. Since, as previously described, the corresponding alarm notification synchronous flag 18 (5) is set, the monitoring process 11 abandons the received alarm re-notification.

More specifically, when a corresponding alarm notification synchronous flag 18 is reset, the monitoring process 11 displays the received alarm re-notification on the monitoring screen 16 in real time and sets the corresponding flag 18. When a corresponding alarm notification synchronous flag 18 is set, it is assumed that an autonomous alarm notification has been received during the alarm re-transmission, and the alarm re-notification is abandoned. Furthermore, when the monitoring process 11 receives the autonomous alarm notification, it processes it in real time, regardless of whether the corresponding alarm notification synchronous flag 18 is set or reset, and sets the corresponding flag 18 if it is reset.

Therefore, the autonomous alarm notification received during the alarm re-transmission can be processed in real time, and also, the order in which the alarm re-notification and the autonomous alarm notification are received will not be inverted. In addition, it can be assumed that, at the time of the receipt of the alarm re-transmission completion notification, the alarm notification synchronous flag 18 which is reset does not satisfy the alarm condition designated in the alarm re-transmission request notification.

In FIG. 7, the autonomous alarm notification (5) is enqueued to the re-transmission thread queue 14 in addition to the monitoring process 11 as described in FIG. 3. The re-transmission thread 13 dequeues the autonomous alarm notification (5) from the re-transmission thread queue 14 and enters it to the database 05, after the re-transmission thread transmits the alarm re-transmission end notification to the monitoring process 11.

As is described above, according to the present invention, it is possible to provide a operation system for transmission device wherein the monitoring process can receive autonomous alarm notifications in real time during normal operations, and alarm re-notifications and autonomous alarm notifications can be processed as a time series, and to provide an alarm monitoring method therefor.

The present invention may be embodied in other specific forms without departing from the spirit or essential characteristics thereof. The present embodiment is therefore to be considered in all respects as illustrative and not restrictive, the scope of the invention being indicated by the appended claims rather than by foregoing description and all change which come within the meaning and range of equivalency of the claims are therefore intended to be embraced therein.

What is claimed is:

1. An operation system for monitoring transmission devices included in a communication network, comprising:
   a storage device for storing an alarm monitoring program including:
      a manager process for receiving a first autonomous alarm notification transmitted from the transmission devices,
      a management information base (MIB) management process for transmitting the first autonomous alarm notification transmitted from the manager process and storing the first autonomous alarm notification to a database, and
      a monitoring process for receiving the first autonomous alarm notification transmitted from the MIB management process and monitoring the first autonomous alarm notification,
      the MIB management process further including:
         a re-transmission thread which is a processing unit in the management process for storing the first autonomous alarm notification in the database;
         a response reception thread which is a processing unit in the management process, for receiving the first autonomous alarm notification transmitted from the manager process and for transmitting the first autonomous alarm notification to the re-transmission thread and the monitoring process; and
      a processor for executing the alarm monitoring program.

2. The operation system according to claim 1, wherein the MIB management process includes a re-transmission thread queue for queuing the autonomous alarm notifications transmitted from the response reception thread, and when the response reception thread receives a second autonomous alarm notification before the first autonomous alarm notification is stored in the database, the response reception thread transmits the second autonomous alarm notification to the monitoring process and enqueues the second autonomous alarm notification to the re-transmission thread queue.

3. The operation system according to claim 2, wherein after the first autonomous alarm notification is stored in the database, the re-transmission thread dequeues the second autonomous alarm notification from the re-transmission thread queue, and stores the second autonomous alarm notification in the database.

4. The operation system according to claim 1, wherein when the monitoring process transmits an alarm re-transmission request notification to the response reception thread to read out the autonomous alarm notification stored in the database, the response reception thread transmits an alarm re-transmission start notification to the monitoring process and the re-transmission thread, the re-transmission thread reads out the autonomous alarm notification stored in the database and transmits the autonomous alarm notification as an alarm re-notification to the monitoring process.

5. The operation system according to claim 4, wherein the memory includes a re-transmission buffer storing the autonomous alarm notification, when the monitoring process receives the autonomous alarm notification transmitted from the response reception thread before receiving the alarm re-notification corresponding the autonomous alarm notification; and
after receiving the alarm re-notification, the monitoring process reads out the third autonomous alarm notification from the re-transmission buffer.

6. The operation system according to claim 5, wherein the memory includes a re-transmission flag which is set when the monitoring process receives the alarm re-transmission start notification; and
the autonomous alarm notification received by the monitoring process is stored in the re-transmission buffer while the re-transmission flag is set, and
after reading out the autonomous alarm notification from the re-transmission buffer by the monitoring process, the re-transmission flag is reset.

7. The operation system according to claim 4, wherein the memory includes an alarm notification synchronous flag corresponding to each the alarm re-notification, which is set when the monitoring process receives the alarm re-notification or the autonomous alarm notification corresponding to the alarm re-notification, and
when the monitoring process receives the alarm re-notification after the corresponding alarm notification synchronous flag is set by receiving the autonomous alarm notification, the monitoring process abandons the alarm re-notification.

8. The operation system according to claim 7, wherein after the alarm re-notification is transmitted to the monitoring process, the autonomous alarm notification is stored in the database.

9. The operation system according to claim 7, wherein the alarm re-transmission start notification has a predetermined condition concerning the autonomous alarm notification stored in the database, and
the re-transmission thread reads out the autonomous alarm notification corresponding to the predetermined condition from the database.

10. The operation system according to claim 9, wherein the predetermined condition is a range condition for designating a range for the autonomous alarm notifications.

11. The operation system according to claim 9, wherein the predetermined condition is an alarm condition for designating a type of the autonomous alarm notifications.

12. A method for monitoring transmission devices included in a communication network, comprising the steps of:

receiving a first autonomous alarm notification transmitted from the transmission devices, as a manager process;

transmitting the first autonomous alarm notification transmitted from the manager process and storing the first autonomous alarm notification to a database, as a management information base (MIB) management process; and receiving the first autonomous alarm notification transmitted from the MIB management process and monitoring the first autonomous alarm notification, as a monitoring process, and the MIB management process including further the steps of:

receiving the first autonomous alarm notification transmitted from the manager process in a response reception thread which is a processing unit in the management process;

transmitting the first autonomous alarm notification to a re-transmission thread which is a processing unit in the management process and to the monitoring process in the response reception thread; and storing the first autonomous alarm notification in the database in the re-transmission thread.

13. The method according to claim 12, wherein, when the response reception thread receives a second autonomous alarm notification before storing the first autonomous alarm notification in the database, the response reception thread transmits the second autonomous alarm notification to the monitoring process and enqueues the second autonomous alarm notification to the re-transmission thread queue for queuing an autonomous alarm notification.

14. The method according to claim 13, wherein after storing the first autonomous alarm notification in the database, the re-transmission thread dequeues the second autonomous alarm notification from the re-transmission thread queue, and stores the second autonomous alarm notification in the database.

15. The method according to claim 12, wherein, when the monitoring process transmits an alarm re-transmission request notification to the response reception thread to read out the autonomous alarm notification stored in the database, the response reception thread transmits an alarm re-transmission start notification to the monitoring process and the re-transmission thread, the re-transmission thread reads out the autonomous alarm notification stored in the database and transmits the autonomous alarm notification as an alarm re-notification to the monitoring process.

16. The method according to claim 15, wherein, when the monitoring process receives the autonomous alarm notification transmitted from the response reception thread before receiving the alarm re-notification corresponding the autonomous alarm notification, the monitoring process stores the autonomous alarm notification in a re-transmission buffer, and after receiving the alarm re-notification, the monitoring process reads out the third autonomous alarm notification from the re-transmission buffer.

17. The method according to claim 16, wherein a re-transmission flag is set when the monitoring process receives the alarm re-transmission start notification, the autonomous alarm notification received by the monitoring process is stored in the re-transmission buffer while the re-transmission flag is set, and after reading out the autonomous alarm notification from the re-transmission buffer by the monitoring process, the re-transmission flag is reset.

18. The method according to claim 15, wherein an alarm notification synchronous flag corresponding to each the alarm re-notification is set when the monitoring process receives the alarm re-notification or the autonomous alarm notification corresponding to the alarm re-notification, and when the monitoring process receives the alarm re-notification after the corresponding alarm notification synchronous flag is set by receiving the autonomous alarm notification, the monitoring process abandons the alarm re-notification.

19. The method according to claim 18, wherein, after the alarm re-notification is transmitted to the monitoring process, the autonomous alarm notification is stored in the database.

20. The method according to claim 18, wherein the alarm re-transmission start notification has a predetermined condition concerning the autonomous alarm notification stored in the database, and the re-transmission thread reads out the autonomous alarm notification corresponding to the predetermined condition from the database.

\* \* \* \* \*